United States Patent
Kang et al.

(10) Patent No.: US 6,584,315 B1
(45) Date of Patent: Jun. 24, 2003

(54) METHOD OF ALLOCATING FRAME OFFSET AND LINK IN BASE STATION

(75) Inventors: Dae-Goo Kang, Kyonggi-do (KR); Kye-Chol Cho, Kyonggi-do (KR); Jun-Ho Chung, Kyonggi-do (KR)

(73) Assignee: Hyundai Electronics Industries Co., Ltd, Kyonggi-do (KR)

( * ) Notice: Subject to any disclaimer, the term of this patent is extended or adjusted under 35 U.S.C. 154(b) by 0 days.

(21) Appl. No.: 09/527,164

(22) Filed: Mar. 17, 2000

(30) Foreign Application Priority Data

Apr. 28, 1999 (KR) .......................... 1999-15245

(51) Int. Cl.[7] ................................. H04Q 7/20
(52) U.S. Cl. .................... 455/442; 455/436; 455/439; 370/209; 370/332
(58) Field of Search ................. 455/442, 436, 455/437, 438, 443, 444, 450, 452, 464, 455, 463; 370/320, 335, 342, 441, 479, 512, 209, 332, 333

(56) References Cited

U.S. PATENT DOCUMENTS

| | | | | |
|---|---|---|---|---|
| 5,267,261 A | * | 11/1993 | Blakeney et al. | 370/332 |
| 5,384,828 A | * | 1/1995 | Brown et al. | 455/463 |
| 5,828,659 A | * | 10/1998 | Teder et al. | 370/328 |
| 5,940,762 A | * | 8/1999 | Lee et al. | 455/442 |
| 5,956,642 A | | 9/1999 | Larsson et al. | |
| 5,970,058 A | * | 10/1999 | DeClerk et al. | 370/331 |
| 6,363,060 B1 | * | 3/2002 | Sarkar | 370/342 |

* cited by examiner

Primary Examiner—Nay Maung
Assistant Examiner—Sonny Trinh
(74) Attorney, Agent, or Firm—R. Neil Sudol; Henry D. Coleman; William J. Sapone

(57) ABSTRACT

A method of allocating frame offset and link in a base station in which performance of digital telecommunications system is enhanced by allocating a resource in such a manner that loads of the link and frame offset are dispersed when communication channels for use of handoff are allocated, and soft handoff can be occurred when the frame offset is allocated, has an advantage in that the link and frame offset are dynamically allocated when requesting handoff so that loads can be evenly distributed between the link and the frame offset. Thus, data loss between the communication channel and the control station may be minimized, and the mobile station may timely perform handoff, thus enabling a stable call handling service.

10 Claims, 3 Drawing Sheets

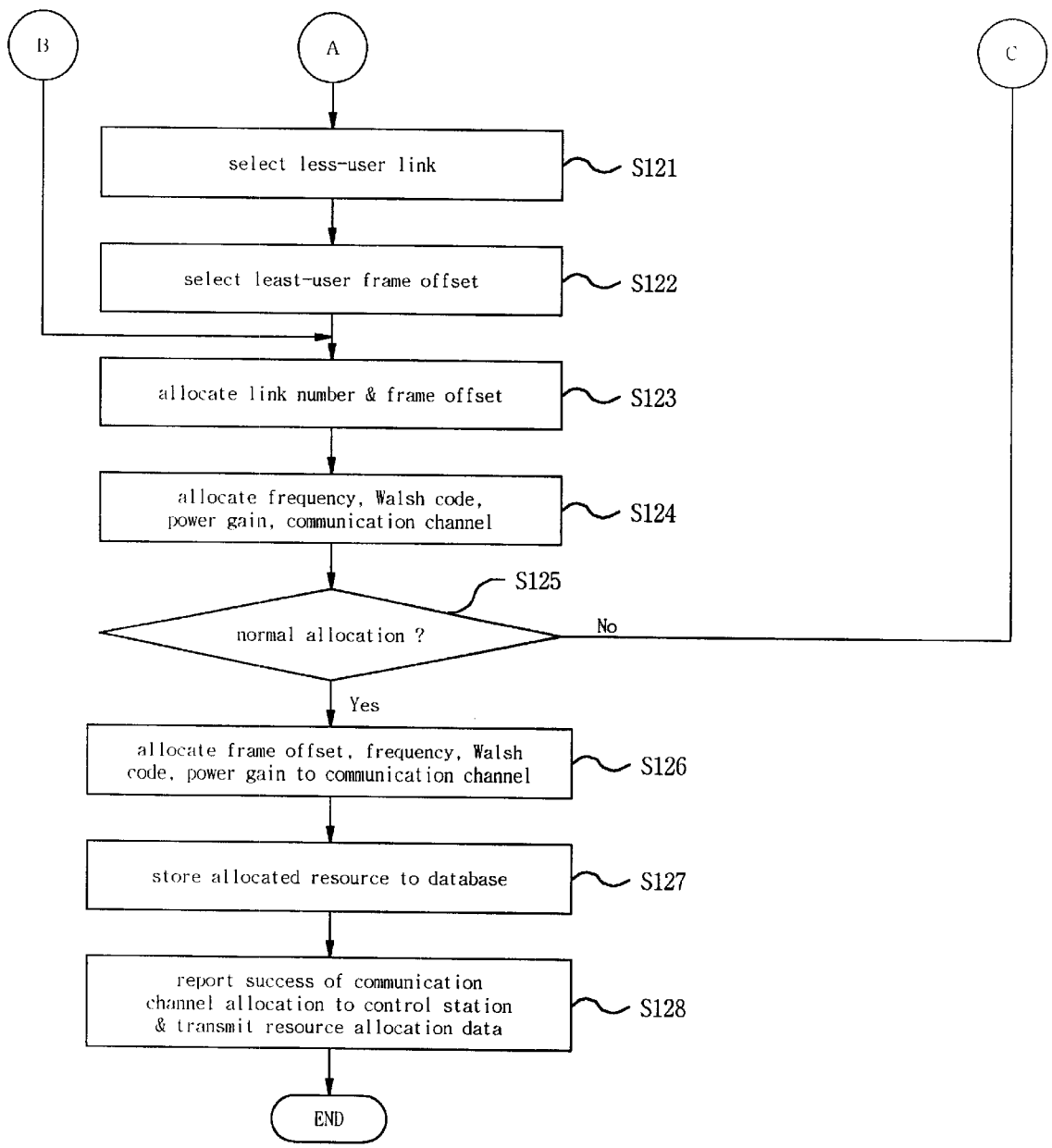

METHOD OF ALLOCATING FRAME OFFSET AND LINK IN BASE STATION

BACKGROUND OF THE INVENTION

1. Field of the Invention

The present invention relates to a method of allocating frame offset and link in mobile telecommunications systems (specifically, digital cellular system (DCSand personal communication service (PCS) system adopting a code division multiple access (CDMA) system). More particularly, the present invention relates to a method of allocating frame offset and link in a base station in which performance of digital telecommunications system is enhanced by allocating a resource in such a manner that loads of the link and frame offset are dispersed when communication channels for use of handoff are allocated, and soft handoff can be occurred when the frame offset is allocated.

2. Description of the Related Art

FIG. 1 illustrates a schematic configuration of a common mobile communications system adopting a CDMA system.

Referring to FIG. 1, the mobile communications system includes a terminal 1 which supports simultaneously or selectively an AMPS (advanced mobile phone service) system and/or CDMA system so that subscribers may communicate via a mobile communication network, a base station 2 which performs communications using a protocol defined in IS-95 in a wireless section together with the terminal 1, a control station 3 which controls wire or wireless link and performs handoff function so as to maintain communications even during the movement of subscribers, an exchanger 4 which constitutes a communication path and performs a connection with other communication network, and a home location register 5 at which subscriber data is recorded and which transmits/receives signals to/from the exchanger 4.

Such a common CDMA mobile communication system is constructed in that the base station 2 efficiently allocate resources, for example, relevant frequency, frame offset, traffic channel, Walsh code, and power gain, for a corresponding call requested by the terminal 1. Then, the base station 2 activates the corresponding traffic channel, the terminal 1 transmits the allocated data (like frame offset or Walsh code) and the allocated resource data to the control station 3, so that the terminal 1, base station 2 and control station 3 may communicate with each other. Such an allocation requires efficient use of the limited frame offset, traffic channel, and link.

In the meantime, the mobile station sends a handoff request message when moved from a current base station to other base station. The control station which has received the handoff request message requests to other base station a set-up of communication channel for handoff. If it is possible to allocate a communication channel for use of handoff using a frequency and frame offset of the message sent from the control station, the other base station to which the communication channel set-up request has been sent allocates Walsh code or power gain managed by the base station to a communication channel, and reports the control station of the success of allocation of communication channel for use of handoff. In case where a frequency and frame offset of the message sent from the control station are absent, failure of allocation of communication channel is reported.

If the frequency strength of other base station is higher than that of the current base station, the mobile station sends a message requesting another handoff. Here, the control station requests other base station to allocate communication channel regardless of frequency or frame offset. Then, the base station allocates communication channel using the frequency and frame offset having the least load. In such case, if the frequency sent from the control station and that sent from the base station are different, hard handoff occurs among frequencies. If the frame offsets are different, hard handoff occurs among frame offsets.

The frame offset among the resources managed by the base station has 16 frame offsets for each link, and a single frame offset is divided into 6 sub-frame offsets, thus 96 sub-frame offsets in total can be used.

Here, the frame offset represents a delay of each frame, and a single frame offset represents a delay of 1.25 msec. To avoid frame overlapping, time for transmitting a frame between the mobile station and the control station is delayed by the amount of allocated frame offset. By this method, data loss between the communication channel and the mobile station may be minimized.

However, in such a conventional method of allocating communication channel for use of handoff, the least-load link is selected when communication channels for use of handoff are allocated in the base station, and the selected link is compared with the frame offset transmitted from the control station. Only in case where the frame offset is unused, the communication channel for use of handoff is allocated. In case where the frame offset transmitted from the control station is used, allocation failure of communication channel for use of handoff is reported to the control station, thus causing handoff failure of the mobile station or inappropriate handoff timing.

In case where the control station requests communication channel allocation for use of handoff regardless of frequency or frame offset, frequency and frame offset received from the control station are not searched. Instead of this, only an effective resource in the base station is searched. As a result, hard handoff among frame offsets which requires acquisition of communication channel for use in handoff of other base station within 0.02 seconds, or hard handoff among frequencies which requires acquisition of communication channel for use in handoff of other base station within 0.08 seconds may occur, thus causing a difficulty in maintaining a call in the mobile station.

SUMMARY OF THE INVENTION

Therefore, it is an object of the present invention to provide a method of allocating frame offset and link in a base station in which performance of digital telecommunications system is enhanced by allocating a resource in such a manner that loads of the link and frame offset are dispersed when communication channels for use in handoff are allocated, and soft handoff can be occurred when the frame offset is allocated.

To accomplish the above object of the present invention, there is provided a method of allocating frame offset and link in a base station including: a first step of storing the data transmitted from a control station when a request for allocation of communication channel for use in handoff is received from the control station, and checking a link state; a second step of realigning the links if the links are all normal, comparing a frame offset received from the control station and a frame offset in the realigned link, and, if a link having a frame offset same as that received from the control station exists, determining whether the link is being used or not; a third step of analyzing the method of allocating a communication channel for use in handoff by data transmitted from the control station if it is determined that the link is being used in the second step, selecting a link having less users if the method is analyzed as a free allocation mode in the second step, and selecting the frame offset having the least users in the selected link; a fourth step of allocating the selected link and allocating a resource (frame offset, frequency, Walsh code, and power gain) to a communication channel; and a fifth step of storing the allocated resource to a database and transmitting to the control station a message indicating an allocation success of the communication channel for use in handoff.

BRIEF DESCRIPTION OF THE DRAWINGS

The present invention will become more fully understood from the detailed description given hereinafter accompanying drawings, which are given by way of illustration only, and thus are not limitative of the present invention, and wherein:

FIGS. 2a and 2b illustrate a method of allocating a frame offset and link-in a base station according to the present invention.

DETAILED DESCRIPTION OF A PREFERRED EMBODIMENT

The present invention will be explained in more detail with reference to the attached drawings.

Figure 1:
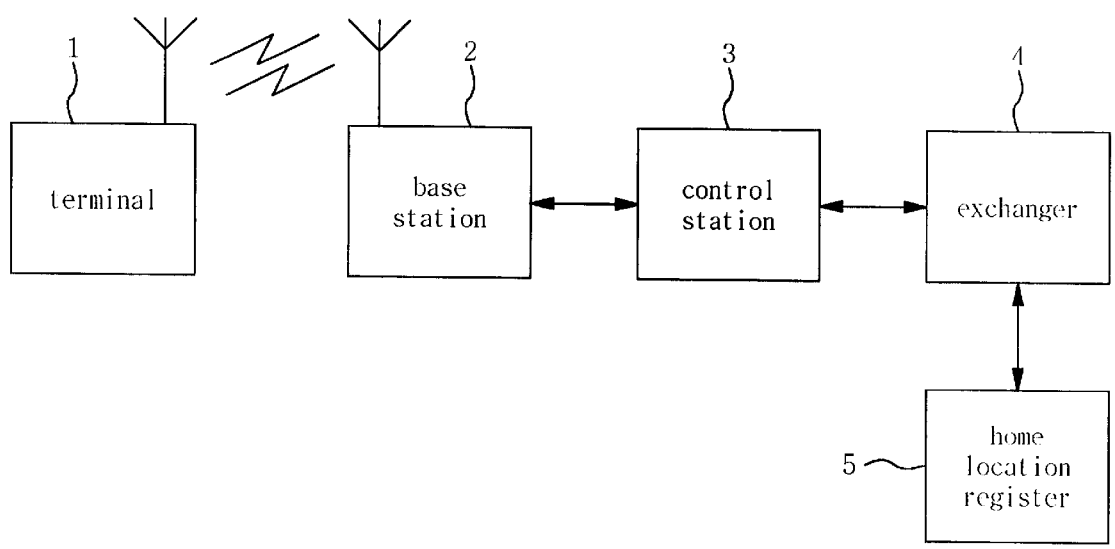
FIG. 1 is a schematic view illustrating a configuration of a common mobile communication system.
Figure 2A:
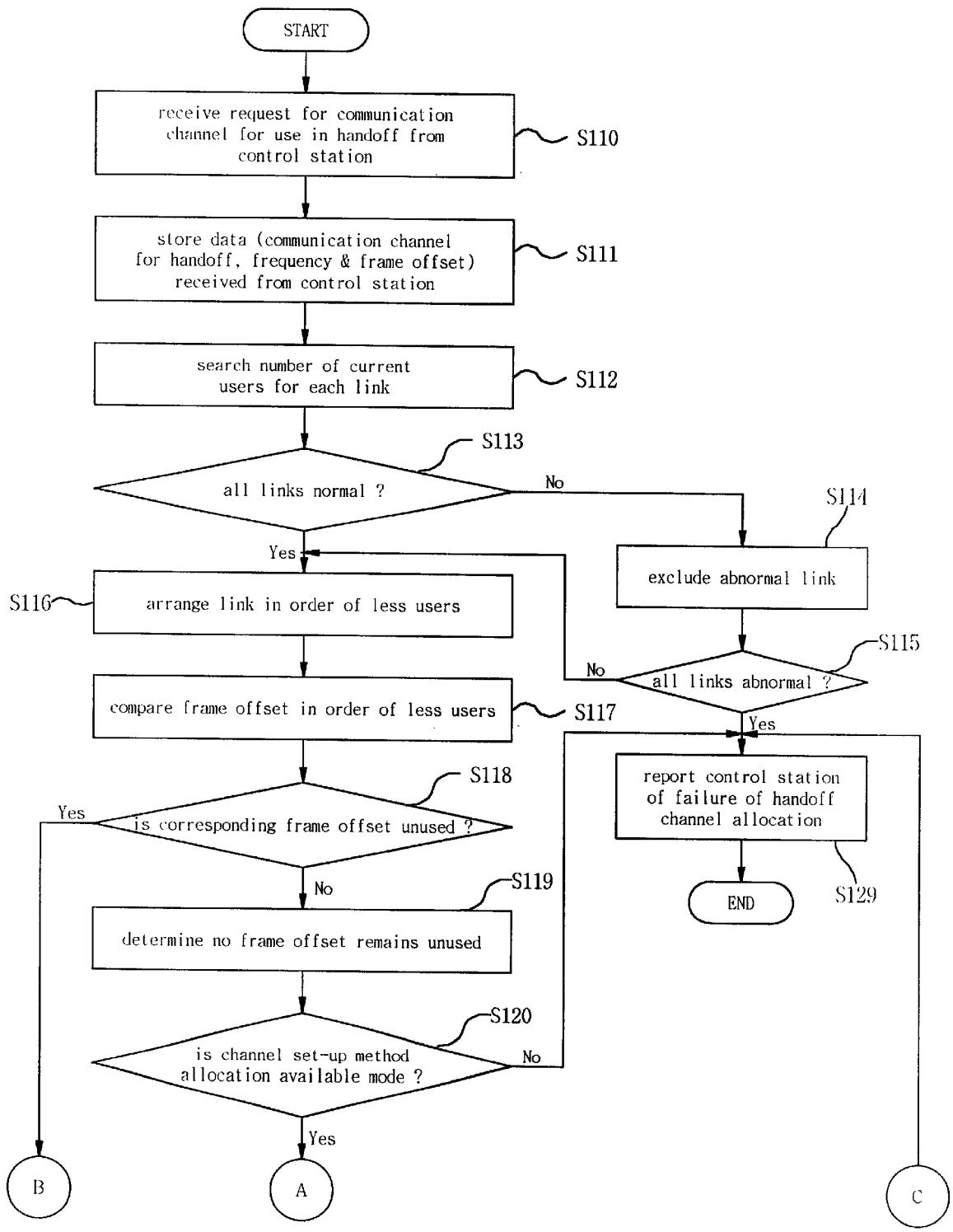

Referring to FIGS. 2a and 2b, when a request for allocation of communication channel for use in handoff is received from the control station, the data transmitted from the control station is stored (step S110 to S111), the number of current users is searched for each link (step S112), and it is checked whether the link state is all normal or not (step S113). If it is checked that all links are not normal, the abnormal link is excluded, and it is again checked whether a normal link exists or not (steps S114 and S115). If all links are determined as abnormal, a failure of allocation of communication channel for use in handoff is reported to the control station (step S129). If all links are determined as normal, the links are arranged in order of minority users (step S116).

After the links are arranged, or if all links are not abnormal, a frame offset comparison is performed in order of less-user link (step S117). Subsequently, the link state having the same frame offsets is checked, and if it is determined as the ink is not used (step S118), an allocation of link number and frame offset is performed (step S123). If the link is determined as being used, it is again determined that no frame offset remains unused (step S119). Then, it is checked whether the method of allocating a communication channel for use in handoff is an allocation available mode or not (step S120). If the method is checked as an unavailable mode, a failure of communication channel for use in handoff is reported to the control station (step S129). If the method is checked as an available mode, the link having less users is selected (step S121).

Amongst the selected link, the frame offset having the least users is selected (step S122), and a link number and frame offset are allocated (step S123). Then, received frequency, Walsh code, power gain, and communication channel are allocated (step S124), and it is checked whether such a resource is normal or not (step S125). If the resource allocation is abnormal, it is determined that whether all links are abnormal (step S115). If the resource allocation is normal, frame offset, frequency, Walsh code, power gain, and communication channel are allocated (step S126), and the allocated resource is allocated to a database (step S127). Communication channel allocation success is reported to the control station and resource allocation data is transmitted (step S128).

A method of allocating a frame offset and link in a base station according to the present invention will be explained in detail.

If the mobile station moves from the current base station to other base station, a handoff request message for a continuation of the call is transmitted to a control station. Then, the control station that has received the handoff request message requests an allocation of communication channel for use in handoff to other base station.

The base station that has received communication channel for use of handoff in the step S110 stores the data transmitted from the control station into an internal memory in the step S111. Here, the data transmitted from the control station to the base station is a method of allocating communication channel for use of handoff, frequency, and frame offset.

The method of allocating communication channel for use of handoff has a fixed allocation mode FULL_FIX_ALLOC which sets up a communication channel for use of handoff according to the frequency and frame offset transmitted from the control station, or an allocation available mode POSSIBLE_ALLOC which sets up a communication channel using an effective resource in the base station regardless of the frequency and frame offset transmitted from the control station.

The frequency transmitted from the control station to the base station is a frequency RxFrequency which is currently used by the mobile station, and the frame offset transmitted from the control station to the base station is a frame offset RxFrameOffset which is currently used by the mobile station.

The base station searches the current number of users for each link in the step S112, and determines link state in the step S113. If an abnormal link exists, the abnormal link is excluded in the step S114, and it is checked whether a normal link remains in the step S115.

If a non-existence of the abnormal link is checked, a failure of allocation of a communication channel for use of handoff is reported to the control station in the step S129. If any normal link exists, or if all links are checked as normal, the links are arranged in order of minority user in the step S116.

Such a link arrangement is performed in accordance with the following formula.

$$\text{Link}[i].\text{UserCnt\_Per\_Blink} < \text{Link}[i+1].\text{UserCnt\_Per\_Blink} < \ldots < \text{Link}[i+n].\text{UserCnt\_Per\_Blink}$$

Wherein, UserCnt_Per_Blink indicates the number of users for each link, i indicates the link number and satisfies the condition of i<Max_Blink_Per_BTS (maximum number of links allocated to the base station).

In the step S117, frame offsets are compared in order of minority users. The base station has 16 frame offsets in maximum for each link, and a single frame offset is divided into 6 sub-frame offsets, thus allowing 96 sub-frame offsets in total.

The following table shows a configuration of link and frame offset of a common base station.

|  | Frame offset | | | | | | | | | | | | | | | |
|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 |
| Number of Users per frame offset | 0 | 0 | 0 | 0 | 0 | 0 | 0 | 0 | 0 | 0 | 0 | 0 | 0 | 0 | 0 | 0 |
|  | 1 | 1 | 1 | 1 | 1 | 1 | 1 | 1 | 1 | 1 | 1 | 1 | 1 | 1 | 1 | 1 |
|  | 2 | 2 | 2 | 2 | 2 | 2 | 2 | 2 | 2 | 2 | 2 | 2 | 2 | 2 | 2 | 2 |
|  | 3 | 3 | 3 | 3 | 3 | 3 | 3 | 3 | 3 | 3 | 3 | 3 | 3 | 3 | 3 | 3 |
|  | 4 | 4 | 4 | 4 | 4 | 4 | 4 | 4 | 4 | 4 | 4 | 4 | 4 | 4 | 4 | 4 |
|  | 5 | 5 | 5 | 5 | 5 | 5 | 5 | 5 | 5 | 5 | 5 | 5 | 5 | 5 | 5 | 5 |

All frame offsets transmitted from the control station are sequentially compared in order of the link having less users by the unit of User_Per_FrameOffset in a single frame offset, so that any unused frame offset may be searched.

If any link having an unused frame offset exists, the process goes to the step S123 so as to allocate link number and frame offset, and the received frequency, Walsh code, power gain, and communication channel are allocated in the step S124. Subsequently, it is checked whether the resource is normally allocated in the step S125. If the resource is abnormally allocated, the process goes to the step S115 for checking a link state. If the resource allocation is normal, the process goes to the step S126 so as to allocate frame offset, frequency, Walsh code, and power gain to a communication channel.

The allocated resource is stored in a database in the step S127, and an allocation success of communication channel is reported to the control station and a resource allocation data is transmitted to the control station in the step S128.

Meanwhile, if a link having an unused frame offset does not exist, it is determined in the step S119 that no frame offset remains unused.

In the step S120, a method of setting-up communication channel for use of handoff transmitted from the control station is searched. If the method is a fixed allocation mode, failure of allocation of handoff communication channel is reported to the control station. If the method is an allocation available mode, a link having less users is selected in the step S121, and a frame offset having the least users is selected in the step S122.

Here, the method of searching the frame offset having the least users in the least-user link is as follows.

Minimum value selection
(Link[i].UserCnt_Per_Blink.UserCnt_Per_FrameOffset[i])

Wherein, Link[i].UserCnt_Per_Blink is the number of the least-user link, UserCnt_Per_FrameOffset[i] is the number of the frame offset having the least user, and UserCnt_Per_FrameOffset is the number of the users of a single frame offset.

As described above, a link number and a frame offset are allocated in the steps S123 and S124 after the link and frame offset are selected. Then, received frequency, Walsh code, power gain, and communication channel are allocated, and it is checked whether those allocation is normal or not.

If those allocation is checked as normal, a frequency is allocated according to the received frequency and Walsh code and power gain are allocated to an effective communication channel in the step S126. Then, the allocated resource data is stored to a database in the step S127, and a message indicating success of allocation of communication channel for use in handoff and resource allocation data are transmitted to the control station in the step S128.

The control station which has received the message indicating the success of communication channel allocation requests handoff to the mobile station. Subsequently, the mobile station continues to perform a call service using a communication channel in the other service area.

As described above, the present invention is advantageous in that the link and frame offset are dynamically allocated when requesting handoff so that loads can be evenly distributed between the link and the frame offset. Thus, data loss between the communication channel and the control station may be minimized, and the mobile station may timely perform handoff, thus enabling a stable call handling service.

When the mobile station enters into an area of other base station and requests handoff, the mobile station avoids hard handoff. having a success probability lower than that of soft handoff. Thus, the mobile station may be provided with a stable communication service.

What is claimed is:

1. A method of allocating frame offset and link in a base station comprising:

a first step of storing data transmitted from a control station and checking a link state when a request for allocation of communication channel for use in handoff is received from said control station;

a second step of realigning said link if said link is all normal, comparing a frame offset transmitted from said control station with a frame offset in said realigned link, and checking whether said link is being used or not if a link having a frame offset same as that transmitted from said control station exists;

a third step of analyzing a method of setting-up communication channel for use in handoff using data transmitted from said control station if said link is checked as being used in said second step, selecting a link having the least users if said method is analyzed as an allocation available mode, and selecting a frame offset having the least users in said selected link;

a fourth step of allocating said selected link, and allocating frame offset, frequency, Walsh code, and power gain to a communication channel; and a fifth step of storing said allocated resource to a database, and transmitting to said control station a message indicating a success of allocation of communication channel for use in handoff.

2. A method of allocating frame offset and link in a base station according to claim 1, further comprising the step of excluding an abnormal link if said link is checked as an abnormal in said step 1, and reporting a failure of allocation of communication channel for use in handoff to said control station if all links are checked as abnormal.

3. A method of allocating frame offset and link in a base station according to claim 1, further comprising the step of repeating said fourth and fifth steps if said link is checked as unused in said second step.

4. A method of allocating frame offset and link in a base station according to claim 1, further comprising the step of analyzing a method of setting-up communication channel for use in handoff using data transmitted from said control station if said link is checked as being used in said second step, and transmitting to said control station a message indicating a failure of channel allocation for use in handoff if said method is analyzed as a fixed allocation mode.

5. A method of allocating frame offset and link in a base station according to claim 1, wherein said data transmitted from said control station is made up of data for controlling a method of setting-up communication channel for use in handoff, frequency data of current mobile station, and frame offset data being used by the current mobile station.

6. A method of allocating frame offset and link in a base station according to claim 1, wherein said link realignment is performed in order of less users.

7. A method of allocating frame offset and link in a base station according to claim 1, wherein said frame offset comparison in said second step is performed in such a manner that links are prioritized in that a link having less users goes uppermost and a link having more users goes lowermost, and said frame offset transmitted from said control station is compared with said frame offset in accordance with said priority so as to search a frame offset having the same frame offset.

8. A method of allocating frame offset and link in a base station according to claim 1, wherein said allocation available mode searches a frequency and frame offset which are not being used in a base station regardless of said frequency and frame offset transmitted from said control station and allocates a communication channel for use in handoff.

9. A method of allocating frame offset and link in a base station according to claim 1, wherein, if said data of setting-up communication channel for use in handoff transmitted from said control station is a fixed, allocation mode, said frame offset transmitted from said control station is compared with frame offsets in each link in said base station, and a handoff communication channel allocation message is transmitted to said control station if any unused frame offset does not exist.

10. A method of allocating frame offset and link in a base station according to claim 4, wherein said fixed allocation mode searches a frequency and frame offset same as those transmitted from said control station and allocates a communication channel for use in handoff.

* * * * *